United States Patent
Wright et al.

(10) Patent No.: US 7,192,246 B2
(45) Date of Patent: Mar. 20, 2007

(54) SEAL ARRANGEMENT IN A MACHINE

(75) Inventors: Christopher Wright, Bristol (GB); Christopher J Finch, Bristol (GB)

(73) Assignee: Rolls-Royce plc, London (GB)

(*) Notice: Subject to any disclaimer, the term of this patent is extended or adjusted under 35 U.S.C. 154(b) by 209 days.

(21) Appl. No.: 11/011,937

(22) Filed: Dec. 15, 2004

(65) Prior Publication Data
US 2005/0151325 A1 Jul. 14, 2005

(30) Foreign Application Priority Data
Dec. 19, 2003 (GB) ................................. 0329371.9

(51) Int. Cl.
*F01D 11/00* (2006.01)
(52) U.S. Cl. .................... 415/174.2; 415/178; 415/231
(58) Field of Classification Search ................ 415/134, 415/136, 137, 173.3, 173.5, 174.2, 174.5, 415/177, 178, 231
See application file for complete search history.

(56) References Cited

U.S. PATENT DOCUMENTS 3,146,992 A * 9/1964 Farrell .......................... 415/12
4,425,079 A * 1/1984 Speak et al. ................. 415/139
4,971,336 A 11/1990 Ferguson
6,435,514 B1 * 8/2002 Aksit et al. .................. 277/355
6,896,482 B2 * 5/2005 Parry .......................... 415/136

FOREIGN PATENT DOCUMENTS

EP 0 950 798 A2 10/1999
GB 2 081 392 A 2/1982

* cited by examiner

*Primary Examiner*—Ninh H. Nguyen
(74) *Attorney, Agent, or Firm*—Oliff & Berridge, PLC

(57) ABSTRACT

A seal arrangement, for example a brush seal 8' in a gas turbine engine, includes thermal matching means for matching the rates of response of a supporting ring 14', 16' of the seal, and of a rotatable component 4 with which the seal cooperates, to thermal changes in the environment of the seal induced by changes in operating conditions. The thermal matching means may comprise a slugging mass 24 and/or thermal insulation 28. Alternatively, or in addition, the region 24 of the housing at which the seal 8' is mounted may be made from a relatively low thermal expansion material. These measures reduce the rate of expansion and contraction of the seal 8' as the temperature in the engine varies so as to match more closely the rate of expansion and contraction of a rotatable component with which the seal cooperates.

20 Claims, 2 Drawing Sheets

SEAL ARRANGEMENT IN A MACHINE

This arrangement relates to a seal arrangement in a machine, and is particularly, although not exclusively, concerned with a brush seal arrangement in a gas turbine engine.

Brush seals are known, for example, from U.S. Pat. No. 4,971,336. A brush seal comprises a supporting ring from which project bristles, usually of metallic wire. In most cases, the bristles project inwardly of the supporting ring, and the supporting ring is mounted in a housing of the machine so that the bristles engage a cylindrical surface on a component which rotates within the housing. The bristle pack restricts gas flow across the seal, while allowing variation in the gap between the housing and the cylindrical surface of the rotating component.

The temperature of the gas flow in a gas turbine varies as the operating state of the engine changes. Thus, as the engine accelerates, more heat is produced and the temperature of the gas flow rises. Similarly, the gas flow becomes cooler on deceleration of the engine. Because the components of the engine have different mass, and are made from different materials, they do not all expand and contract at uniform rates as the gas flow temperature changes. Additionally, the temperature profile of the gas flow may not be homogenous, so that some components may be washed by a cooler gas flow than others. Typically, turbine discs and the shafts on which they are supported will respond relatively slowly to changes in engine temperature by comparison with the engine casing. Consequently, as the engine temperature increases, a brush seal supported by a housing, such as part of the engine casing, will expand at a greater rate than the engine shaft, against which the bristle pack engages. The sealing gap between the housing and the shaft thus increases and the sealing efficiency of the seal may reduce. In some circumstances, the bristles may entirely leave contact with the cylindrical surface of the shaft.

As the engine cools on deceleration, the opposite effect occurs, and the sealing gap will decrease, causing increased wear and possible permanent deformation of the bristle pack. This can further degrade the sealing ability of the seal as the engine heats up in subsequent operating cycles.

According to the present invention there is provided a seal arrangement in a machine, the seal arrangement comprising a supporting ring carrying sealing means which cooperates with a surface of a component of the machine which is rotatable relative to the supporting ring, thermal matching means being provided for matching the rates of response of the supporting ring and of the component to thermal changes in the environment of the seal induced by changes the in operating condition of the machine.

By matching the rates of response of the supporting ring and the rotatable component to thermal changes, variations in the size of the sealing gap can be minimised, so improving the performance of the seal over the operating cycle of the machine.

The thermal matching means may reduce the rate of response of the supporting ring or of a housing in which the supporting ring is mounted. In one embodiment, the thermal matching means may comprise a slugging mass, which may be in direct contact with the supporting ring and/or the housing. The slugging mass increases the thermal inertia of the supporting ring and/or the housing, so as to reduce the rate of response of the supporting ring to temperature changes.

In addition to, or instead of, the slugging mass, the housing, at least in the region at which the supporting ring is mounted, may be made from a material of relatively low coefficient of thermal expansion. In particular, the coefficient of thermal expansion of the housing in that region is preferably lower than that of the rotatable component. In the context of the present invention, a low coefficient of thermal expansion means a coefficient of less than $10 \times 10^{-6}/°$ K. By way of example, INCO 907 has a coefficient $8-9 \times 10^{6}/°$ K.

The thermal matching means may comprise insulation which at least partially surrounds the supporting ring and optionally the slugging mass (if provided) and the adjacent region of the housing. The insulation serves to delay transmission of heat from the gas flow through the engine to the supporting ring, the slugging mass and the housing, and so reduces the rate of response of the supporting ring to thermal changes. The insulation may comprise a layer of insulating material. Alternatively, or in addition, the insulation may comprise a heat shield incorporating an air gap.

The supporting ring may be secured rigidly to the housing, so that the supporting ring and the housing expand and contract in unison. However, this may cause significant stresses in the supporting ring and/or the housing, particularly if the housing is made from a material with a relatively low coefficient of thermal expansion. In order to reduce such stresses, the supporting ring may be mounted in the housing in a manner which permits relative radial displacement between the supporting ring and the housing as a result of temperature variations. For example, when cold, the supporting ring may be mounted relatively loosely in the housing so that there is a radial clearance between the supporting ring and the housing, which radial clearance varies with temperature. At a relatively high temperature, the radial clearance may be eliminated, so that further increases in temperature cause the supporting ring and the housing to expand in unison.

In order to prevent rotation of the supporting ring relatively to the housing when a clearance exists, means may be provided for rotationally engaging the supporting ring with the housing.

The seal arrangement preferably comprises a brush seal, including bristles carried by the supporting ring which engage the rotatable component. However, the present invention is also applicable to other forms of seal, for example labyrinth seals, in which it is desirable to minimise variations in the sealing gap as a result of thermal effects.

For a better understanding of the present invention, and to show more clearly how it may be carried into effect, reference will now be made, by way of example, to the accompanying drawings, in which.

Figure 1:
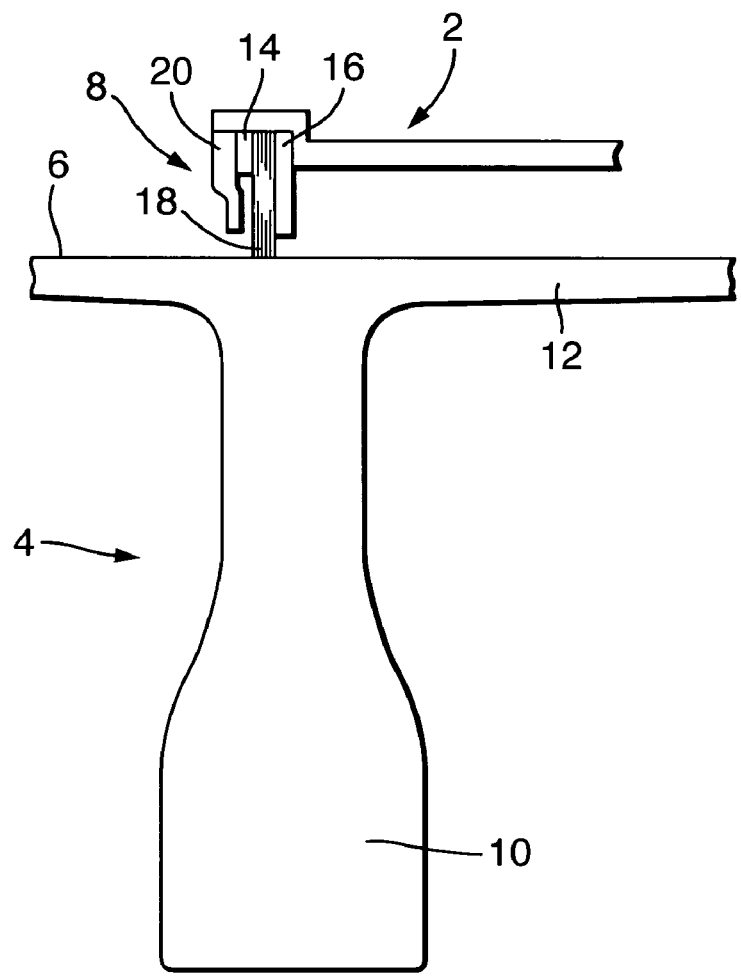
FIG. 1 shows a known brush seal arrangement in a gas turbine engine.

FIG. 1 shows part of a gas turbine engine comprising a housing 2 within which a component 4 is rotatable. The component 4 has a cylindrical surface 6, and the gap between the surface 6 and the housing 2 is sealed by a brush seal 8. The rotatable component 4 may comprise a disc 10 carrying a rotor 12.

The brush seal 8 comprises a supporting ring made up of two ring pieces 14 and 16 which retain between them a bristle pack 18. The ring pieces 14 and 16, and the individual bristles of the bristle pack 18 are welded together at the upper end of the brush seal, as seen in FIG. 1. The free ends of the bristles in the bristle pack 18 contact the cylindrical surface 6, and the tightly packed bristles thus restrict gas flow between the surface 6 and the housing 2. The brush seal 8 is mounted within the housing 2 and retained in position by an annular retaining plate 20.

Figure 3:
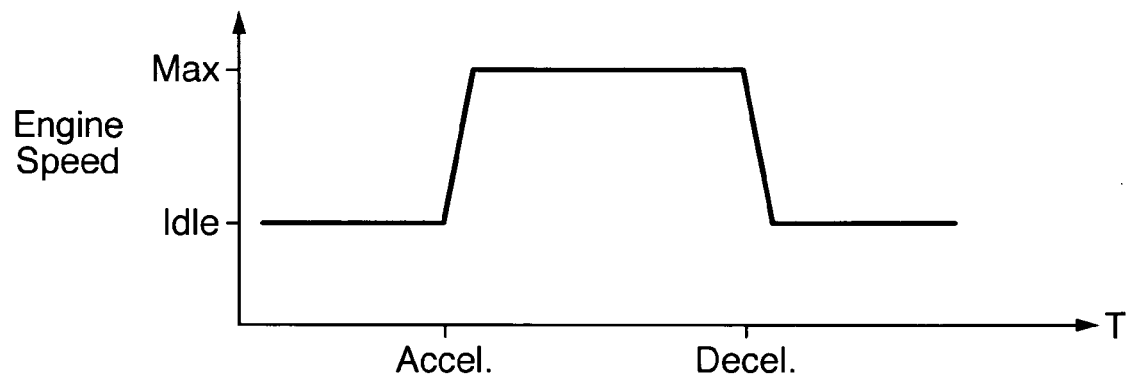
FIG. 3 represents variations in sealing gap over an operating cycle of an engine.
Figure 3:
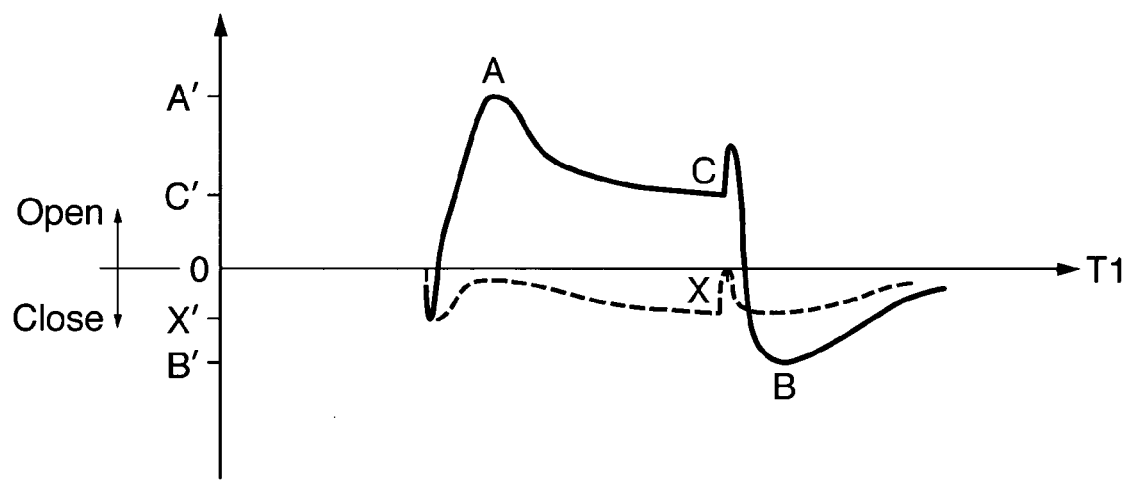

FIG. 3 represents the behaviour of the sealing arrangement of FIG. 1 over an operating cycle of the engine. The upper graph of FIG. 3 shows the change in speed of the engine over time, including an acceleration stage from idle to maximum speed, the maintenance of the maximum speed for a period of time, and the deceleration of the engine from the maximum speed back to idle. The lower graph shows, as a solid line, variations in the sealing gap of the prior art sealing arrangement 8 shown in FIG. 1. The graph demonstrates that, as the engine accelerates, there is an immediate closing of the gap owing to radial expansion of the rotatable component 4 under centrifugal forces. Subsequently, the gap widens again as the housing 2 and supporting ring 14, 16 expand radially owing to the increased temperature of the gas flow through the engine. Since these components are of relatively small mass compared to that of the rotatable component 4, they heat up rapidly, and so expand away from the surface 6. At the point A in FIG. 3, the supporting ring 14, 16 and the housing 2 have expanded to their maximum extent and the gap begins to close again as the rotatable component 4 also undergoes thermal expansion. When deceleration occurs at point C, there is an immediate increase in the gap size as the rotatable component 4 radially contracts as the centrifugal forces on it decrease. Subsequently, the gap closes significantly as the supporting ring 14, 16 and the housing 2 contract as their temperature decreases, followed from point B by the convergence of the gap to the idle value as the rotatable component 4 also cools.

It will be appreciated that, when the gap is at its narrowest, at point B, the bristles of the seal 8 will be forced strongly against the cylindrical surface 6 and will undergo significant wear. This will reduce the length of the bristles over time, and consequently will also reduce the overall effectiveness of the seal. Thus, it may be expected for the bristles 18 eventually to just touch the cylindrical surface 6 at point B. This means that the operating gap between the tips of the bristles and the cylindrical surface 6 at idle may be represented by the dimension OB' in FIG. 3, while the maximum operating gap on acceleration can be represented by A' B' and at continuous running at maximum speed by C' B'.

Such large operating gaps can cause disadvantages, and in particular can reduce the efficiency of the engine.

Figure 2:
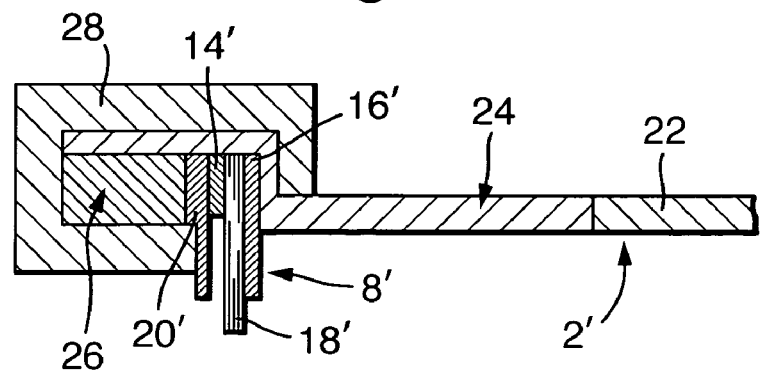
FIG. 2 is an enlarged view of a brush seal arrangement in accordance with the present invention.

FIG. 2 shows a modification of the seal arrangement of FIG. 1 with a view to avoiding these disadvantages. In the embodiment of FIG. 2, which is in accordance with the present invention, the housing 2' comprises a main portion 22 and an end portion 24 which is made from INCO 907 a low thermal expansion material, which has a coefficient of thermal expansion which is between 8 to $9 \times 10^{-6}/^\circ$ K. Preferably, the material from which the front portion 24 is made has a coefficient of thermal expansion which is lower than that of the material from which the rotatable component 4 is made. For example, the coefficient of expansion of the material of the front portion 24 is preferably not more than 75%, and more preferably not more than 60% of the coefficient of expansion of the material from which the rotatable component 4 is made. By way of example, the rotatable component 4 may be made from a nickel-based superalloy having high strength at high temperatures, such as INCO 718 which has a coefficient of thermal expansion of between 13 to $15 \times 10^{-6}/^\circ$ K., C269 or Nimonic 90.

Another suitable material, ie having a low thermal expansion coefficient for the front portion 24 of the housing 2' is INCO 607.

A slugging mass 26 is provided which is in direct contact with the front housing portion 24 and the retaining plate 20' of the seal assembly 8'. The slugging mass 26 may be made from a similar material to that of the rotatable component 4, or from a low thermal expansion alloy. Insulation, in the form of a layer 28 of thermally insulating material, extends around the slugging mass 26 and part of the front portion 24 of the housing 2'. It also thus partially encloses the supporting ring 14', 16' of the seal assembly 8'.

In operation, the combination of the insulation 28, the slugging mass 26 and the low thermal expansion material of the front portion 24 serve to reduce the rate at which the supporting ring 14', 16' expands as the temperature of the gas flow washing over the seal arrangement 8 increases. Thus, the insulation 28 reduces the rate of heat transfer to the seal arrangement 8', while the slugging mass 26 serves to absorb heat and thus reduce the rate of temperature increase. Because the front portion 24 is made from a low thermal expansion material, it will resist expansion of the supporting ring 14', 16'.

The effect of these measures is represented by the dotted line in the lower graph of FIG. 3. Thus, although the initial closing of the seal gap remains, owing to the centrifugal effects acting on the rotatable component 4, subsequent expansion of the gap under acceleration is limited to a valve approximately equal to, or even less than, the idle value. As the rotatable component 4 hats up during sustained operation at maximum speed the gap reduces to a value represented by the point X on the graph. Upon deceleration, the gap increases as the rotatable component 4 contracts radially as the centrifugal effects are reduced, whereafter contraction of the support ring 14', 16' as it cools results in a minimum gap similar to that at point X, whereafter cooling of the rotatable component 4 causes the gap to return towards the idle value.

It will be appreciated that the much reduced variation in the gap will reduce the wear on the bristle pack so that the operating gap will remain substantially constant at over the full operating cycle. In particular, the size of the gap idle, on acceleration and at maximum continuous operation will be represented by the value OX'.

Figure 4:
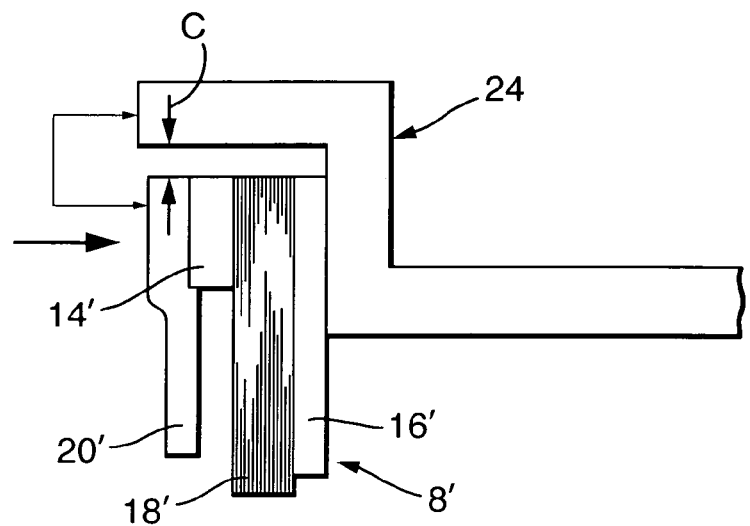
FIG. 4 corresponds to FIG. 2 but shows an alternative embodiment in accordance with the present invention.

It will be appreciated that the constraint imposed by the low thermal expansion material of the front portion 24 of the housing 2' will result in stressing of the components as it acts to resist expansion of the supporting ring 14', 16' of the seal arrangement 8'. To avoid overstressing of the components, a clearance may be provided between the seal arrangement 8' and the front housing portion 24 as shown in FIG. 4 when the components are cold. In this embodiment, a clearance c is provided when the components are at the temperature corresponding to idling of the engine. Coupling means, represented at 30, is provided to prevent rotation of the seal assembly 8' relative to the front housing portion 24 when the clearance c exists. It will be appreciated that the seal arrangement shown in FIG. 4 may be provided with a slugging mass 26 and/or insulation 28 as shown in FIG. 2.

During operation, the supporting ring 14', 16' will initially expand as the temperature increases at a rate determined by the coefficient of thermal expansion of the material of the supporting ring 14', 16' as modified by the slugging mass 6 and the insulation 28 (if provided). During the acceleration phase, the supporting ring 14', 16' will eventually contact the radially inwardly directed face 32 of the front housing portion 24, so closing the clearance c, whereafter the low thermal expansion front housing portion 24 will reduce the rate of expansion of the supporting ring 14', 16'. Consequently, while the sealing gap may initially increase at a greater rate than with the embodiment shown in FIG. 2, there is less risk of overstressing the components as a result of the different rates of expansion.

Although the present invention has been described by reference to a brush seal in a gas turbine engine, it will be appreciated that the thermal matching measures described are also applicable to other types of seal, for example labyrinth seals, and may be employed in machines other than gas turbine engines.

Furthermore, while one objective of the present invention is to reduce variation in seal gap during variations in engine operating condition, these measures may be adapted to achieve desired seal gaps under particular conditions, for example to reduce the seal gap to enhance sealing under high power demand from the engine.

The invention claimed is:

1. A seal arrangement in a machine, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine; and
   wherein the thermal matching means reduces the rate of response of the supporting ring.

2. A seal arrangement as claimed in claim 1, in which the thermal matching means comprises a slugging mass.

3. A seal arrangement as claimed in claim 2, in which the slugging mass is in thermal contact with the supporting ring.

4. A seal arrangement as claimed in claim 2, in which the supporting ring is mounted in a housing of the machine and the slugging mass is in thermal contact with the housing.

5. A seal arrangement as claimed in claim 2, in which the slugging mass is made from a nickel-based superalloy.

6. A seal arrangement as claimed in claim 2, in which the coefficient of thermal expansion of the material of the slugging mass is lower than that of the material of the rotatable component.

7. A seal arrangement as claimed in claim 2, in which the thermal matching means further comprises insulation which at least partially encloses the supporting ring and in which the insulation partially encloses the slugging mass.

8. A seal arrangement in a machine, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine;
   wherein the supporting ring is mounted in a housing of the machine;
   wherein the supporting ring is mounted in the housing in a manner permitting radial displacement between the supporting ring and the housing as a result of temperature variations; and
   wherein a radial clearance exists between the housing and the supporting ring when the housing and the supporting ring are at a first temperature, the radial clearance being closed when the housing and the supporting ring are at a second temperature.

9. A seal arrangement in a machine, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine;
   wherein the supporting ring is mounted in a housing of the machine;
   wherein the supporting ring is mounted in the housing in a manner permitting radial displacement between the supporting ring and the housing as a result of temperature variations; and
   wherein the coefficient of thermal expansion of the material of the supporting ring is greater than that of the material of the housing at the region at which the supporting ring is mounted.

10. A seal arrangement in a machine, the seal arrangement comprising:
    a supporting ring carrying sealing means which cooperates with a surface of a component of the machine which is rotatable relative to the supporting ring;
    thermal matching means being provided for matching the rates of response of the supporting ring and of the component to thermal changes in the environment of the seal induced by changes in the operating condition of the machine;
    wherein the supporting ring is mounted in a housing of the machine;
    wherein the supporting ring is mounted in the housing in a manner permitting radial displacement between the supporting ring and the housing as a result of temperature variations; and
    wherein means is provided for rotationally coupling the supporting ring and the housing.

11. A seal arrangement in a machine, the seal arrangement comprising:
    a supporting ring carrying sealing means which cooperates with a surface of a component of the machine which is rotatable relative to the supporting ring;
    thermal matching means being provided for matching the rates of response of the supporting ring and of the component to thermal changes in the environment of the seal induced by changes in the operating condition of the machine;
    wherein the supporting ring is mounted in a housing of the machine;
    wherein the coefficient of thermal expansion of the material of the region of the housing at which the supporting ring is mounted is lower than that of the material of the rotatable component.

12. A seal arrangement in a machine the seal arrangement comprising:
    a supporting ring carrying sealing means which cooperates with a surface of a component of the machine which is rotatable relative to the supporting ring;
    thermal matching means being provided for matching the rates of response of the supporting ring and of the component to thermal changes in the environment of the seal induced by changes in the operating condition of the machine; and wherein the thermal matching means further comprises insulation which at least partially encloses the supporting ring.

13. A seal arrangement as claimed in claim 12, in which the insulation at least partially encloses the region of the housing at which the supporting ring is mounted.

14. A seal arrangement as claimed in claim 12, in which the insulation is formed from a material of low thermal conductivity.

15. A seal arrangement as claimed in claim 12, in which the insulation comprises a heat shield.

16. A seal arrangement in a machine, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine; and
   wherein the sealing means comprises bristles extending from the supporting ring towards the rotatable component.

17. A seal arrangement in a machine, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine;
   wherein the machine is a gas turbine engine; and
   further wherein the thermal matching means reduces the rate of response of the supporting ring.

18. A seal arrangement as claimed in claim 17, in which the thermal matching means is adapted to reduce displacement of the supporting ring away from the rotatable component during temperature increase on engine acceleration.

19. A seal arrangement as claimed in claim 17 in which the thermal matching means is adapted to reduce displacement of the supporting ring towards the rotatable component during temperature decrease on engine deceleration.

20. A gas turbine engine having a seal arrangement, the seal arrangement comprising:
   a supporting ring carrying sealing means which cooperates with a surface of a component of the machine which is rotatable relative to the supporting ring;
   thermal matching means being provided for matching the rates of response of the supporting ring and of the component to thermal changes in the environment of the seal induced by changes in the operating condition of the machine; and
   wherein the thermal matching means reduces the rate of response of the supporting ring.

* * * * *